(12) United States Patent
Hedayat et al.

(10) Patent No.: US 8,116,698 B2
(45) Date of Patent: Feb. 14, 2012

(54) GENERALIZED MIMO-BEAMFORMING WEIGHT ESTIMATION

(75) Inventors: Ahmadreza Hedayat, Allen, TX (US); Genyuan Wang, Plano, TX (US); Hang Jin, Plano, TX (US); Hanqing Lou, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 12/181,383

(22) Filed: Jul. 29, 2008

(65) Prior Publication Data

US 2009/0042618 A1 Feb. 12, 2009

Related U.S. Application Data

(60) Provisional application No. 60/954,542, filed on Aug. 7, 2007.

(51) Int. Cl.
*H03C 7/02* (2006.01)
*H04M 1/00* (2006.01)
*H04B 1/00* (2006.01)
*H04B 15/00* (2006.01)

(52) U.S. Cl. ............ 455/103; 455/562.1; 455/561; 455/63.4

(58) Field of Classification Search .......... 455/562.1, 455/561, 103, 101, 78, 63.4; 375/260, 267, 375/285; 342/367, 373
See application file for complete search history.

(56) References Cited

U.S. PATENT DOCUMENTS 5,459,873 A 10/1995 Moore et al.
(Continued)

FOREIGN PATENT DOCUMENTS

WO 2005109677 A1 11/2005
WO 2006138555 A2 12/2006

OTHER PUBLICATIONS

Zhou, S.; Giannakis, G.B.; , "Optimal transmitter eigen-beamforming and space-time block coding based on channel mean feedback," Signal Processing, IEEE Transactions on , vol. 50, No. 10, pp. 2599-2613, Oct. 2002 doi: 10.1109/TSP.2002.803355 URL: http://ieeexplore.ieee.org/stamp/stamp.jsp?tp=&arnumber=1033689&isnumber=22196.*

(Continued)

*Primary Examiner* — Temesgh Ghebretinsae
*Assistant Examiner* — Devan Sandiford
(74) *Attorney, Agent, or Firm* — Edell, Shapiro & Finnan, LLC

(57) ABSTRACT

Techniques are provided to enable wireless communication between first and second wireless communication devices each having a plurality of antennas, where the second device sends the transmissions via less than all of its plurality of antennas. Each transmission may comprise a plurality of time-frequency instances. At the first communication device, data is derived representing parameters of a communication channel between the plurality of antennas of the first device and all of the plurality of antennas of the second device from the transmissions received at the plurality of antennas of the first device. Beamforming weights for transmitting one or more signal streams via the plurality of antennas of the first device to the plurality of antennas of the second device are computed based on the data representing parameters of the communication channel between the plurality of antennas of the first device and the plurality of antennas of the second device. The beamforming weights are applied to the one or more signal streams to be transmitted via the plurality of antennas of the first device to the plurality of antennas of the second device.

26 Claims, 5 Drawing Sheets

U.S. PATENT DOCUMENTS

| | | |
|---|---|---|
| 6,671,496 B1 | 12/2003 | Hoshi |
| 2004/0018818 A1* | 1/2004 | Hottinen et al. ............... 455/78 |
| 2005/0095996 A1* | 5/2005 | Takano ........................ 455/91 |
| 2005/0185618 A1 | 8/2005 | Friday et al. |
| 2007/0054633 A1* | 3/2007 | Piirainen ................... 455/115.3 |
| 2007/0071147 A1 | 3/2007 | Sampath et al. |
| 2007/0268815 A1 | 11/2007 | Wee et al. |
| 2008/0108314 A1* | 5/2008 | Mihota ........................ 455/101 |
| 2009/0098838 A1 | 4/2009 | Guo et al. |
| 2009/0274236 A1* | 11/2009 | Mihota ........................ 375/267 |

OTHER PUBLICATIONS

PCT International Search Report and Written Opinion in counterpart International Application No. PCT/US08/072077, dated Mar. 5, 2009.

Zhou, "Optimal Transmitter Eigen-Beamforming and Space-Time Block Coding Based on Channel Mean Feedback", IEEE Transactions on Signal Processing, vol. 50, No. 10, Oct. 2002, (pp. 2599-2613).

* cited by examiner

FIG. 1
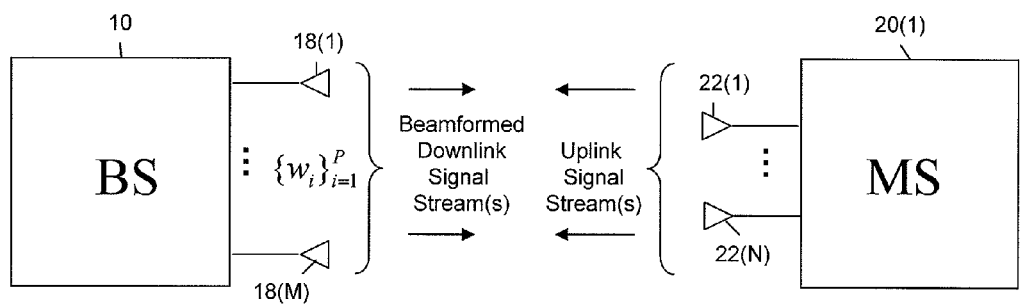
BS derives knowledge of the downlink channel for active and inactive MS antennas based on received uplink transmissions sent by MS on K active (K ≤ N) antennas to compute downlink MIMO beamforming weights $\{w_i\}_{i=1}^{P}$
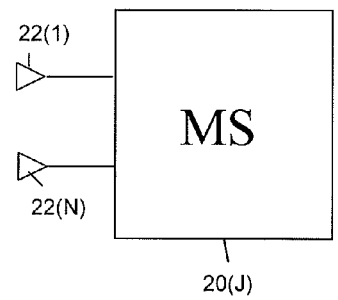

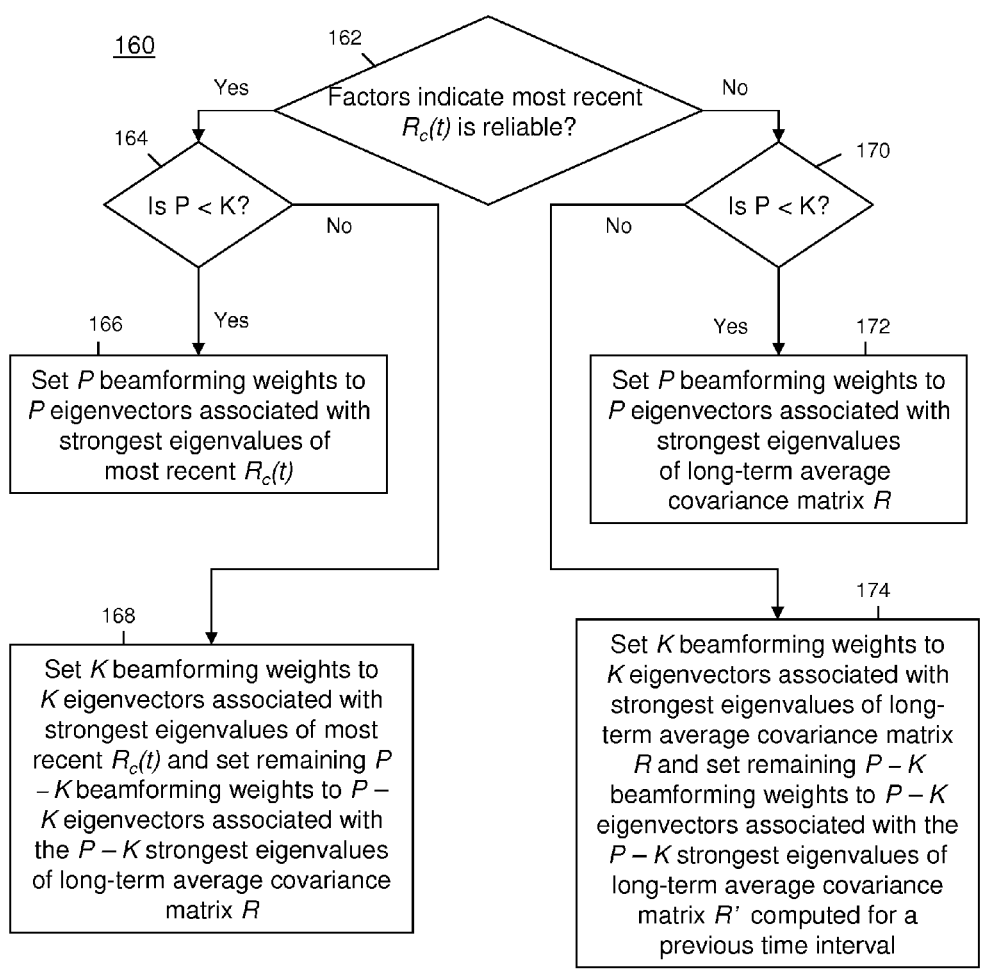

GENERALIZED MIMO-BEAMFORMING WEIGHT ESTIMATION

CROSS-REFERENCE TO RELATED APPLICATIONS

This application claims priority to U.S. Provisional Patent Application No. 60/954,542, filed Aug. 7, 2007, the entirety of which is incorporated herein by reference.

BACKGROUND

In wireless communication systems, antenna arrays are used at devices on one or both ends of a communication link to suppress multipath fading and interference and to increase system capacity by supporting multiple co-channel users and/or higher data rate transmissions.

For example, in time-division duplex (TDD) systems, a base station (BS) device and each of a plurality of mobile station (MS) devices are equipped with a plurality of antenna. In general, the BS device may be referred to as a first wireless communication device and a MS device may be referred to as a second wireless communication device, or vice versa.

For cost and other reasons, one device on the communication link, e.g., a MS device, may use all of its plurality of antennas only for receiving signals. For example, an MS device may have N plurality of antennas and N receivers, each of which is configured to receive a signal from a respective one of the N plurality of antennas. However, in order to reduce the cost, the MS device may have less than N transmitters since each transmitter requires its own power amplifier and related circuitry. Thus, the MS device cannot transmit using all of its plurality of antennas. In one particular example in which an MS device has four (N=4) antennas, it has four receivers but only two transmitters. Thus, in this example, it can be said that the MS device has two active antennas and two inactive antennas for purposes of transmissions. Consequently, when a BS device receives signals from that MS device, it cannot directly estimate the channel with respect to all of the antennas of the MS device because the transmissions from the MS device are made from less than all of the antennas of the MS device.

A need exists to derive knowledge of a communication channel between a first device having a plurality of antennas and a second device having a plurality of antennas when the second device transmits to the first device using less than all of its antennas. Using this knowledge of the channel, more accurate values for beamforming weights can be computed for transmitting signals from the plurality of antennas of the first device to all of the plurality of antennas of the second device, such as in a multiple-input multiple-output (MIMO) communication system.

BRIEF DESCRIPTION OF THE DRAWINGS

FIG. 1 is a block diagram showing an example of a MIMO wireless communication system in which a first communication device (e.g., base station) derives knowledge of a wireless communication channel between a plurality of antennas of the first communication device and a plurality of antennas of a second communication device based on signals received at the first communication that were transmitted by less than all of the plurality of antennas of the second communication device.

FIG. 4 is a flow chart depicting further details of the process shown in FIG. 3.

DESCRIPTION OF EXAMPLE EMBODIMENTS

Overview

Figure 2:
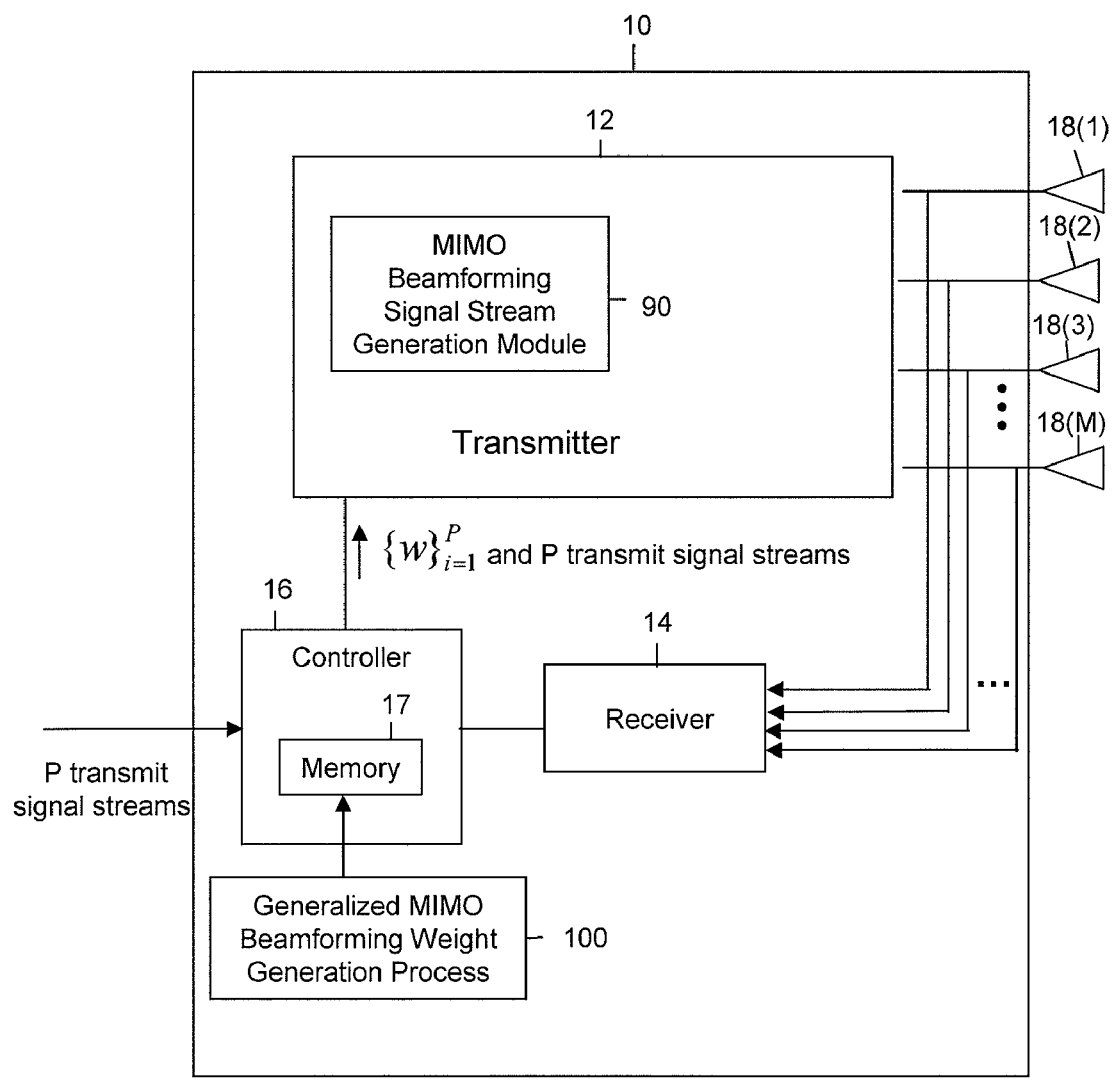
FIG. 2 is a block diagram of a first communication device that is configured to compute beamforming weights for transmitting one or more signals streams to a second communication device when the second communication device transmits on less than all of its antennas.

Techniques are provided to enable wireless communication between first and second wireless communication devices each having a plurality of antennas, where the second device sends the transmissions via less than all of its plurality of antennas. Each transmission may comprise a plurality of time-frequency instances. At the first communication device, data is derived representing parameters of a communication channel between the plurality of antennas of the first device and all of the plurality of antennas of the second device from the transmissions received at the plurality of antennas of the first device. Beamforming weights for transmitting one or more signal streams via the plurality of antennas of the first device to the plurality of antennas of the second device are computed based on the data representing parameters of the communication channel between the plurality of antennas of the first device and the plurality of antennas of the second device. The beamforming weights are applied to the one or more signal streams to be transmitted via the plurality of antennas of the first device to the plurality of antennas of the second device.

Referring first to FIG. 1, a wireless radio communication system or network is shown generally at reference numeral 5 and comprises a first communication device, e.g., a base station (BS) 10, and a plurality of second communication devices, e.g., mobile stations (MS's) 20(1)-20(J). The BS 10 may connect to other wired data network facilities (not shown) and in that sense serves as a gateway or access point through which the MS's 20(1)-20(J) have access to those data network facilities.

The BS 10 comprises a first plurality of antennas 18(1)-18(M) and the MS's 20(1)-20(K) comprise a second plurality of antennas 22(1)-22(N). The BS 10 may wirelessly communicate with individual ones of the MS's 20(1)-20(J) using a wideband wireless communication protocol in which the bandwidth is much larger than the coherent frequency bandwidth. An example of such a wireless communication protocol is the IEEE 802.16 communication standard, also known commercially as WiMAX™.

However, in general, the system 5 may employ a single-carrier or multi-carrier modulation format. One example of a multi-carrier modulation format is orthogonal frequency-division multiplexing/multiple-access (OFDM/OFDMA) technology. The BS 10 performs various forms of beamforming and precoding when transmitting one or more signals streams on the downlink channel to a particular MS, e.g., MS 20(1), based on the knowledge derived from signals that the BS 10 receives from the MS 20(1). More specifically, the BS derives knowledge of the downlink channel for active and inactive antennas of MS 20(1) based on received uplink transmissions sent by MS 20(1) on K active (K≦N) antennas in order to compute downlink MIMO beamforming weights $\{w\}_{i=1}^{P}$ for P signal streams to be transmitted from the BS 10 to all (N) antennas of the MS 20(1). In so doing, the BS 10 examines the condition of the channel and decides to perform the best available beamforming and precoding schemes.

FIG. 1 is illustrative more generally of a wireless communication link between two nodes or devices, where the first node or device is the BS 10 that has M antennas and the second node or device is an MS, e.g., MS 20(1) that has N antennas. Due to the reciprocity of a time division duplex (TDD) channel, the BS 10 can learn about the downlink channel (from its M antennas to the N antennas of MS 20(1)) by observing conditions of the uplink channel based on signals that the BS 10 receives at its M antennas from less than all (K≦N) of the antennas of the MS 20(1). For simplicity, the term BS is used hereinafter instead of the terms first node or first device and the term MS is used hereinafter instead of the terms second node or second communication device. However, the techniques described herein are general and can be applied even if first node is not a BS and/or the second node is not a MS.

As explained above, an MS, e.g., MS 20(1), uses all of its N antennas for receiving purposes, i.e., receiving signals on a downlink channel from the BS 10, but may use only a subset (K) of its N antennas for transmission purposes on the uplink channel when transmitting to the BS 10. Therefore the BS 10 needs to perform additional processing on the received uplink transmissions from the K active antennas of the MS 20(1) in order to derive knowledge of the downlink channel between the M plurality of antennas of the BS 10 and all of the N plurality of antennas of the MS 20(1), which includes those antennas that are not active during uplink transmissions. This derived knowledge of the complete channel (between all M antennas of the BS 10 and all N antennas of the MS 20(1)) is used to compute beamforming weights for MIMO beamforming transmission of one or more signals streams to the MS 20(1)).

The M×N MIMO channel from BS 10 to MS 20(1) (i.e., the downlink channel) may be represented by:

$$H = \begin{pmatrix} h_{1,1} & \cdots & h_{1,K} & h_{1,K+1} & \cdots & h_{1,N} \\ \vdots & \ddots & \vdots & \vdots & \ddots & \vdots \\ h_{M,1} & \cdots & h_{M,K} & h_{M,K+1} & \cdots & h_{M,N} \end{pmatrix} = (\tilde{H}_{M \times K} \ \overline{H}_{M \times (N-K)}),$$

where K is the number of antennas in MS 20(1) that are active in uplink transmissions, i.e., 1<=K<=N. Without loss of generality, it is assumed that the first K antennas of MS 20(1) are the active antennas. However, such arrangement and indexing does not imply any limitation on the physical arrangement of the antenna arrays in the MS 20(1) or in the BS 10.

The downlink channel H may be decomposed into two parts:
$\tilde{H}$ with size M×K, which is the first K columns of H, and is observed in uplink transmissions;
$\overline{H}$ with size M×(N−K), which is the last N−K columns of H, and is not observed in uplink transmissions.

This decomposition is exploited as described hereinafter to derive the channel H and from that to compute the P beamforming or precoding weights $\{w\}_{i=1}^{P}$, as described hereinafter in conjunction with FIGS. 3 and 4. For instance, if P=1 then only one signal is being sent via the antenna array and only one BF weight is needed. This is equivalent to traditional beamforming. When P>1, more than one beamforming weight is needed and these weights can be used to either improve the performance of traditional beamforming by introducing further diversity, or can be used to increase the throughput by simultaneously transmitting more than one signal stream.

Turning to FIG. 2, an example of a block diagram is shown of a wireless communication device that may serve as a BS 10. The BS 10 comprises a transmitter 12, a receiver 14 and a controller 16. The controller 16 supplies data, obtained from higher control/transport layers in the device, to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas (antennas 18(1)-18 (M)) for transmission. To this end, the transmitter 12 comprises a MIMO beamforming signal stream generation module 90 that applies the P beamforming weights $\{w\}_{i=1}^{P}$ to P signal streams to be transmitted via antennas 18(1)-18(M). The receiver 14 receives the signals detected by each of the antennas 18(1)-18(M) and supplies corresponding antenna-specific receive signals to controller 16. It is understood that the receiver 14 may comprise a plurality of receiver circuits, each for a corresponding one of a plurality of antennas. For simplicity, these individual receiver circuits and individual transmitter circuits are not shown.

The controller 16 comprises a memory 17 or other data storage block that stores data used for the techniques described herein. The memory 17 may be separate or part of the controller 16. Instructions for performing a generalized MIMO beamforming weight generation process 100 may be stored in the memory 17 for execution by the controller 16. The process 100 generates the sequence of beamforming weights $\{w\}_{i=1}^{P}$ that are supplied to the transmitter 12 for use by the module 90.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the MIMO beamforming signal stream generation module 90 and the generalized MIMO beamforming weight generation process 100 may be performed by the same logic component, e.g., the controller 16.

Figure 3:
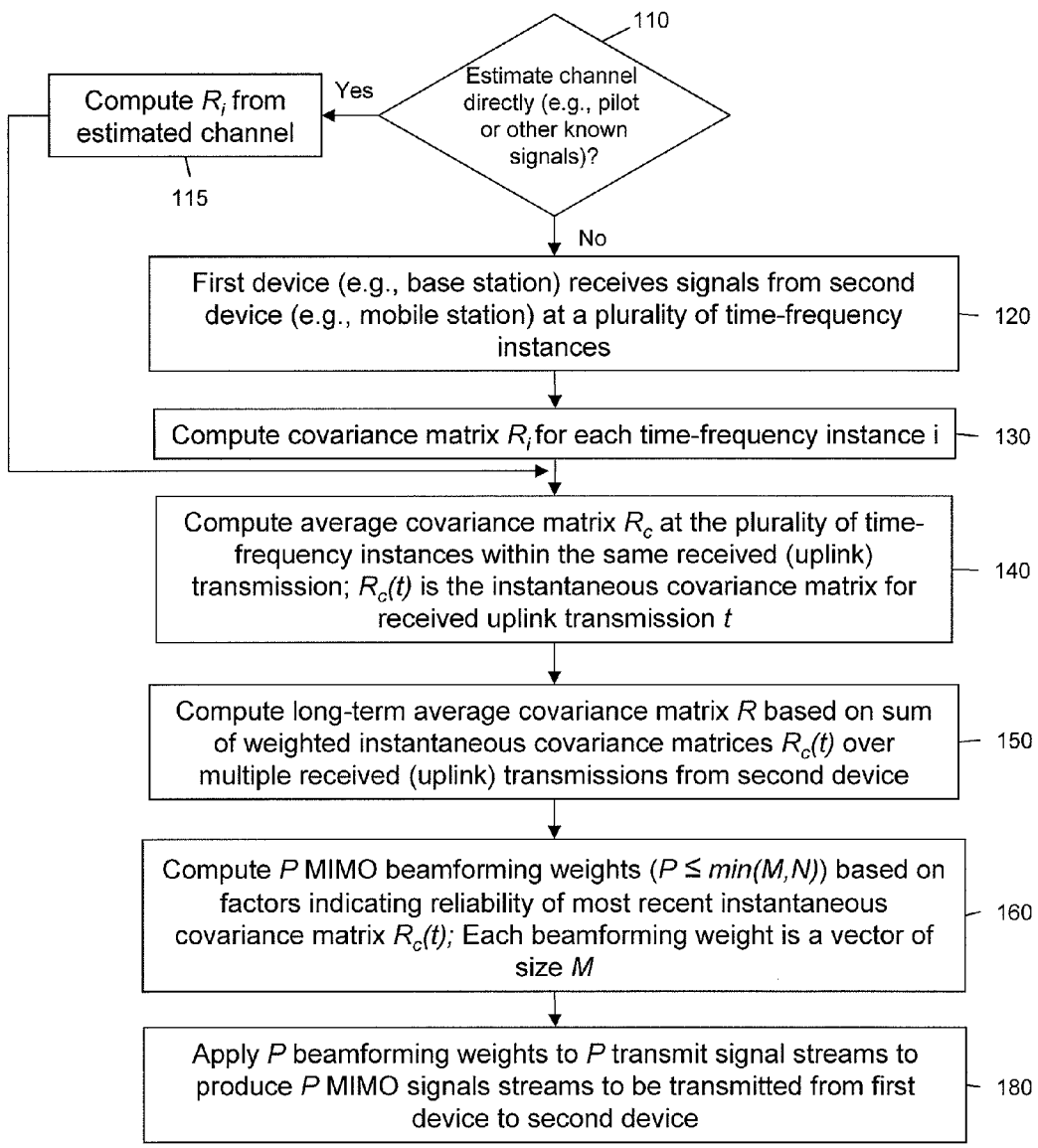
FIG. 3 is a flow chart generally depicting an example of a process for computing beamforming weights for transmitting one or more signals streams from a first communication device to a second communication device when the second communication device transmits on less than all of its antennas.

Turning now to FIG. 3, the generalized MIMO beamforming weight generation process 100 is now described. Briefly, the process 100 comprises receiving at a plurality of antennas of a first device transmissions sent via less than all of a plurality of antennas of a second device. Data is derived that represents parameters of a communication channel between the plurality of antennas of the first device and all of the plurality of antennas of the second device from the transmissions received at the plurality of antennas of the first device. Beamforming weights for transmitting one or more signal streams via the plurality of antennas of the first device to the plurality of antennas of the second device are computed based on the data representing parameters of the communication channel between the plurality of antennas of the first device and the plurality of antennas of the second device. For example, the data representing the communication channel is derived by computing a covariance between the plurality of antennas of the first device and the plurality of antennas of the second device for received transmissions, and the beamforming weights are computed based on the covariance, the number of signals streams to be transmitted from the first device to the second device and the number of antennas of the second device used for transmitting to the first device.

The beamforming weights are applied to the one or more signal streams to be transmitted via the plurality of antennas of the first device to the plurality of antennas of the second device.

The process 100 is now described in more detail. At 110, it is determined whether the BS 10 can directly estimate the channel. In some applications the BS 10 may have the capability to directly estimate $\tilde{H}$ (per each tone or some of the tones) directly, e.g., from pilot signals or other known transmitted (e.g., training) signals from the MS. In this case, then at 115, a covariance matrix $R_i$ is computed as $R_i = \tilde{H}\tilde{H}^H$ (where the superscript H denotes the Hermitian operator) and the process 100 proceeds to 140 described hereinafter to compute an instantaneous covariance matrix for a received transmission from the covariance matrices $R_i$ for multiple time-frequency instances i within a received transmission. It is also possible to average the covariance matrix $R_i$ in other ways, for instance, selecting $R_i = \tilde{H}\tilde{H}^H$ associated with a middle tone. Thus, the techniques described herein are useful for configurations where a BS has the capability to directly estimate the channel H and for configurations where a BS does not have such capability.

Figure 5A:
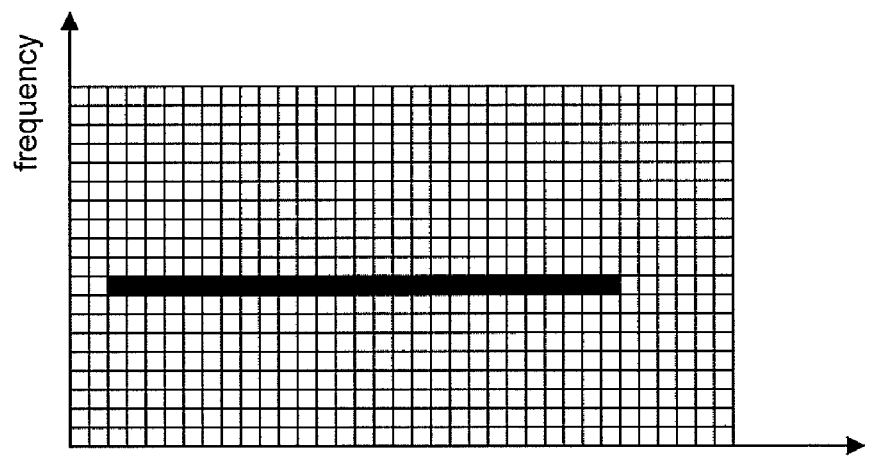
FIGS. 5A, 5B and 5C are diagrams that depict examples of types of signals for which the generalized beamforming weight computation process described herein may be employed.
Figure 5B:
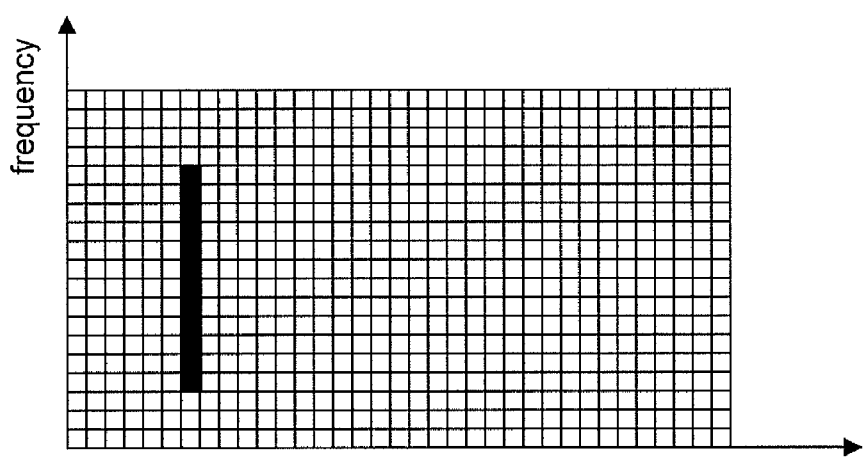
Figure 5C:
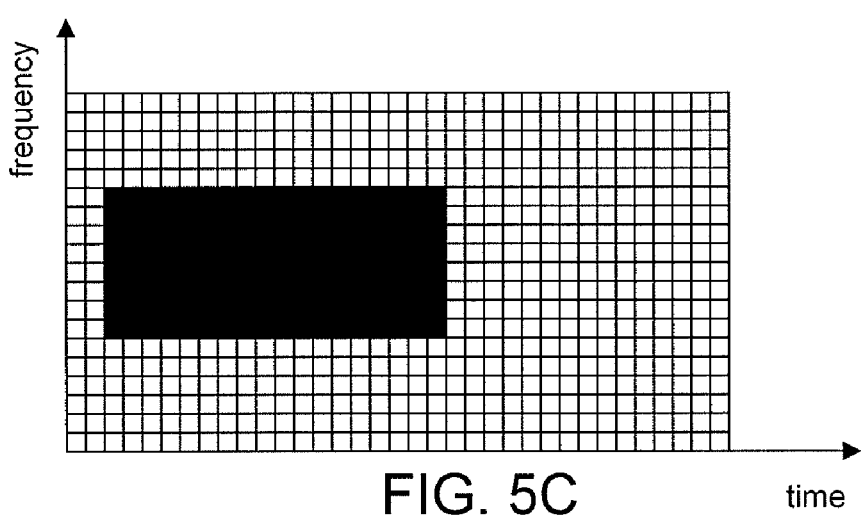

If the BS does not have capability to directly estimate the channel, then at 120, the BS receives transmission (on the uplink channel) from the MS. Each transmission may comprise a plurality of time-frequency instances. Each time-frequency instance can be (a) a single frequency at a plurality of time instances as shown in FIG. 5A (i.e., a single carrier signal), or (b) a single time instance at a plurality of frequencies as shown in FIG. 5B, or (c) a plurality of time instances at a plurality of frequencies as shown in FIG. 5C, where FIGS. 5B and 5C are examples of multi-carrier signals. The plurality of time instances or frequency instances or both need not be consecutive, thought they are shown that way in FIGS. 5A-5C for the sake of simplicity.

As explained above, these transmissions are sent via K antennas of the MS, where in general 1<=K<=N. At a given time-frequency instant the BS receives a signal Y, where:

$$Y = \begin{pmatrix} y_1 \\ \vdots \\ y_M \end{pmatrix} = \begin{pmatrix} h_{1,1} & \cdots & h_{1,K} \\ \vdots & \ddots & \vdots \\ h_{M,1} & \cdots & h_{M,K} \end{pmatrix} \begin{pmatrix} s_1 \\ \vdots \\ s_K \end{pmatrix} + \begin{pmatrix} n_1 \\ \vdots \\ n_M \end{pmatrix} = \tilde{H} \begin{pmatrix} s_1 \\ \vdots \\ s_K \end{pmatrix} + \begin{pmatrix} n_1 \\ \vdots \\ n_M \end{pmatrix}$$

Next, at 130, the BS computes a covariance matrix $R_i = YY^H$, where the superscript H refers to the Hermitian operator, and the index i is an index for the time-frequency instance for which the covariance matrix is computed.

At 140, using the covariance matrices $R_i$ (computed at 130 or computed at 115), the BS computes an average covariance matrix $R_C$ over a plurality of time-frequency instances within the same uplink transmission received at the plurality of antennas of the BS 10, using the computation $$R_C = \frac{1}{L} \sum_{i=1}^{L} R_i,$$

where the index i indexes the time-frequency instances (within the same received uplink transmission), and L is the total number of such time-frequency instances. The covariance matrix $R_C$ is the instantaneous covariance matrix obtained from a single received uplink transmission and can serve as a good reference for computing MIMO beamforming or precoding weights.

At 150, the BS 10 computes a long-term average covariance matrix R based on a sum of weighted average covariance matrices $R_C(t)$ over multiple received uplink transmissions from the MS 20(1), where the variable t is an index for the received uplink transmission instance. The BS 10 computes the matrix R based on several $R_C(t)$:

$$R = \sum_{t=1}^{T} \alpha_t R_C(t),$$

where T is a window of several consecutive uplink transmissions, and $\alpha_t$ are weights associated with each $R_C(t)$. Data is stored for the long-term covariance matrices computed over time (over multiple time periods each comprising several consecutive uplink transmissions). This allows for use of the long-term average covariance matrix computed for a previous time period in computing the beamforming weights, as described hereinafter in conjunction with FIG. 4.

The weights $\alpha_t$ are set to values based on several factors. For example, the weight $\alpha_t$ may be set to a value between one and zero, depending on one or more of: the signal-to-noise ratio (SNR) or the signal-to-interference-plus-noise ratio (SINR) at the BS 10 (of the uplink channel, that is, the SNR or SINR associated with signals received at the BS 10 from the MS 20(1)); degree of movement of one or both of the BS 10 and MS 20(1), also known as the so-called Doppler frequency effects; and time difference between time of transmissions from the MS 20(1) to the BS 10 and time of transmission from the BS 10 to the MS 20(1). For example, if the instantaneous SNR or SINR at the BS 10 at time instance $t_i$ is low then the instantaneous covariance matrix for that uplink transmission, $R_C(t_i)$, is given a lower weight, or may not be included in the calculation for R by simply setting $\alpha_{t_i}=0$. Another basis for setting the values of $\alpha_t$ is to weight the older in time covariance matrices $R_C(t)$ with smaller values than more recent covariance matrices. Still another technique for setting the values of the weights $\alpha_t$ is based on the degree of movement of the MS 20(1), or equivalently based on the Doppler frequency associated with the channel between the BS and MS 20(1). If the Doppler frequency of the channel is high then the instantaneous covariance matrices $R_C(t)$ become less reliable faster, hence the observation window T should be smaller, and/or the weights $\alpha_t$ should be set to smaller values for even the immediate past (most recent) covariance matrices.

Next, at 160, using the long-term average covariance matrix R computed at 150 and the instantaneous covariance matrix $R_C$ computed at 140 for each uplink transmission, the P MIMO beamforming or precoding weights (where P≦min (M,N)) are computed using a computation technique that depends on factors indicating the reliability (or unreliability) of the most recent instantaneous covariance matrix Rc(t). Each P beamforming weight is a vector of size M corresponding to the number of antennas of the BS 10. The computations for the P beamforming or precoding weights at 160 are described in detail hereinafter in conjunction with FIG. 4.

At 180, the P beamforming weights are applied to P transmit signal streams to produce P MIMO signal streams that are transmitted via the M plurality of antennas of the BS 10 to the N plurality of antennas of MS 20(1).

Turning to FIG. 4, the process 160 for computing the P beamforming weights at 160 is now described. After computing the instantaneous covariance matrix $R_C(t)$ for the most recently received transmission (hereinafter also referred to as the most recent instantaneous covariance matrix) and the long-term average covariance R, the BS computes beamforming weights (equivalently precoding weights) for MIMO transmission. The techniques described herein are applicable to any type of MIMO scheme that the BS can use on the downlink channel and may range from space-time coding to spatial multiplexing. Depending on the particular MIMO transmission scheme that the BS uses, only P different BF weights may be needed. P may be larger than K, but no larger than min(M,N), the minimum of the number of antennas at the MS 20(1) and BS 10.

At 162, one or more factors that indicate reliability of the most recent covariance matrix $R_C(t)$ are examined to determine whether the most recent covariance matrix is reliable. For example, these factors may include one or more of a measure of frequency mismatch in the uplink and downlink channels between the BS 10 and MS 20(1); degree of movement of one or both of the BS 10 and MS 20(1) (i.e., Doppler frequency), time difference between time of transmission from the MS 20(1) to the BS 10 and time of transmission from the BS 10 to the MS 20(1); and quality of the received transmission from which the covariance matrix $R_C(t)$ is computed.

For example, if the frequency mismatch between the uplink and downlink channels is relatively small, the Doppler frequency is low, the time for the next downlink transmission to the MS 20(1) is not much later than the time of the transmission for which the most recent covariance matrix $R_C(t)$ was computed, and the uplink signal quality is good, then the covariance matrix $R_C(t)$ is said to be reliable and thus may be used to compute some or all of the P beamforming or precoding weights. Otherwise, $R_C(t)$ may not be reliable and all of the P beamforming or precoding weights are computed from the long-term average covariance R.

To this end, at 162, when it is determined, using one or more of the factors described above, that the most recent instantaneous covariance matrix $R_C(t)$ is reliable, then at 164 it is determined whether the number P of transmit signal streams to be sent (and consequently the number P of beamforming or precoding weights needed) is less than the number K of active antennas at the MS 20(1). When P<K (the number of required beamforming or precoding weights is less than the number of active antennas of MS 20(1)), then at 166 the P beamforming weights are set to the P eigenvectors associated with the strongest eigenvalues of the most recent covariance matrix $R_C(t)$.

When at 164 it is determined that P>K (the number of required beamforming or precoding weights is greater than the number of active antennas in MS 20(1)), then at 168 the P beamforming weights are set as follows. The first K beamforming weights (in the P beamforming weights) are set to the K eigenvectors associated with the strongest eigenvalues of the most recent covariance matrix $R_C(t)$ and the remaining P−K beamforming weights are set to the P−K eigenvectors associated with the P−K strongest eigenvalues of the long-term average covariance matrix R.

When at 162 it is determined, using one or more of the factors discussed above, that the most recent instantaneous covariance matrix is not reliable, then at 170, it is determined whether the number of transmit signal streams to be sent (and consequently the number of P beamforming or precoding weights needed) is less than the number K of active antennas at the MS 20(1). When at 170 it is determined that P<K (the number of required beamforming or precoding weights is less than the number of active antennas of MS 20(1)), then at 172 the P beamforming weights are set to the P eigenvectors associated with the strongest eigenvalues of the long-term average covariance matrix R.

When at 170 it is determined that P>K (the number of required beamforming or precoding weights is greater than the number of active antennas in MS 20(1)), then at 174 the P beamforming weights are set as follows. The first K beamforming weights (in the P beamforming weights) are set to the K eigenvectors associated with the strongest eigenvalues of the long-term average covariance matrix R and the remaining P−K beamforming weights are set to the P−K eigenvectors associated with the P−K strongest eigenvalues of the long-term average covariance matrix R' computed over multiple transmissions for a previous time period or time window (as opposed to the long-term average covariance matrix R computed for the most recent time period).

The eigenvectors referred to above at 166, 168, 172 and 174 may be computed either through eigenvalue decomposition or through other equivalent implementations such as singular-vale decomposition, or through a sub-optimum implementation that roughly computes the eigenvectors. Moreover, in any one or more of the scenarios shown at 166, 168, 172 and 174, the BS 10 may allocate power equally or unequally among all of the beams that are formed by transmission from the M plurality of antennas of the BS 10.

Depending on the type of MIMO scheme employed, the BS 10 may be configured to use only the long-term average covariance matrix R to compute the beamforming weights, regardless of the reliability of the most recent instantaneous covariance matrix $R_C(t)$ determined at 162. Moreover, the BS 10 may be further configured to compute a correlation between the first K weights and the remaining P−K weights so that depending on the correlation between the first K weights and the remaining P−K weights, the first device, e.g. BS, may choose a different MIMO scheme to use. For instance, if P=2 and K=1 and the correlation between the first weight and the second weight is higher than a certain threshold, the BS may perform space-time coding. Otherwise, the BS may perform a high-throughput MIMO scheme, e.g., spatial multiplexing. In short, depending on the correlation among the set of the weights, the BS might select one or more MIMO schemes over others.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a plurality of antennas of a first device, receiving transmissions sent via less than all of a plurality of antennas of a second device, wherein each transmission comprises a plurality of time-frequency instances;

computing a covariance matrix at the plurality of time-frequency instances within a received transmission and computing an instantaneous covariance matrix for a received transmission by averaging the covariance matrices for the plurality of time-frequency instances within a received transmission;

computing a long-term average covariance matrix from a sum of instantaneous covariance matrices over a time period comprising multiple transmissions received from the second device at the first device;

determining a reliability of the instantaneous covariance matrix for a most recently received transmission from the second device;

computing beamforming weights for transmitting one or more signal streams via the plurality of antennas of the first device to the plurality of antennas of the second device based on the reliability of the instantaneous covariance matrix, wherein when it is determined that the instantaneous covariance matrix for the most recently received transmission is reliable, computing the beamforming weights is based on select eigenvectors associated with eigenvalues of the instantaneous covariance matrix for the most recent transmission and of the long-term average covariance matrix depending on whether a number P of signal streams to be transmitted from the first device to the second device and thus the number P of beamforming weights needed is greater than a number K of antennas at the second device used for transmissions to the first device, and when it is determined that the instantaneous covariance matrix for the most recently received transmission is not reliable, computing the beamforming weights based on the long-term average covariance matrix; and applying the beamforming weights to the one or more signal streams to be transmitted via the plurality of antennas of the first device to the plurality of antennas of the second device.

2. The method of claim 1, wherein determining the reliability of the instantaneous covariance matrix for the most recently received transmission comprises evaluating at least one of: a measure of frequency mismatch in uplink and downlink channels between the first and second devices; degree of movement of one or both of the first and second devices; time difference between time of transmission from the second device to the first device and time of transmission from the first device to the second device; and quality of the received transmission for which the instantaneous covariance matrix is computed.

3. The method of claim 1, wherein computing the long-term average covariance matrix comprises weighting the respective instantaneous covariance matrices based on at least one of: signal-to-noise ratio of signals received at the first device from the second device; signal-to-interference-plus-noise ratio of signals received at the first device from the second device; degree of movement of one or both of the first and second devices; and time difference between time of transmission from the second device to the first device and time of transmission from the first device to the second device.

4. The method of claim 1, wherein when the instantaneous covariance matrix for the most recently received transmission is reliable and when the number P of signal streams to be transmitted from the first device to the second device and thus the number P of beamforming weights needed is less than the number K of antennas at the second device used for transmissions to the first device, computing the beamforming weights comprises setting the beamforming weights to P eigenvectors corresponding to the strongest eigenvalues of the instantaneous covariance matrix for the most recently received transmission.

5. The method of claim 1, wherein when the instantaneous covariance matrix for the most recently received transmission is reliable and when the number P of signal streams to be transmitted from the first device to the second device and thus the number P of beamforming weights needed is greater than the number K of antennas at the second device used for transmissions to the first device, computing the beamforming weights comprises setting the first K beamforming weights to K eigenvectors associated with the strongest eigenvalues of the instantaneous covariance matrix for the most recently received transmission and setting the remaining P−K beamforming weights to P−K eigenvectors associated with the P−K strongest eigenvalues of the long-term average covariance matrix R.

6. The method of claim 1, wherein when the instantaneous covariance matrix for the most recently received transmission is not reliable and when the number P of signal streams to be transmitted from the first device to the second device and thus the number P of beamforming weights needed is less than the number K of antennas at the second device used for transmissions to the first device, computing the beamforming weights comprises setting the beamforming weights to P eigenvectors corresponding to the strongest eigenvalues of the long-term average covariance matrix.

7. The method of claim 1, wherein when the instantaneous covariance matrix for the most recently received transmission is not reliable and when the number P of signal streams to be transmitted from the first device to the second device and thus the number P of beamforming weights needed is greater than the number K of antennas at the second device used for transmissions to the first device, computing the beamforming weights comprises setting the first K beamforming weights to K eigenvectors associated with the strongest eigenvalues of the long-term average covariance matrix R and setting the remaining P−K beamforming weights to P−K eigenvectors associated with the P−K strongest eigenvalues of a long-term average covariance matrix computed over multiple transmission for a previous time period.

8. The method of claim 1, wherein computing the beamforming weights is based on the long-term average covariance matrix regardless of the reliability of the instantaneous covariance matrix for the most recently received transmission.

9. The method of claim 1, wherein computing the beamforming weights is such that power is unequally distributed among a plurality of beams resulting from application of the beamforming weights to the one or more signal streams.

10. The method of claim 1, and further comprising computing a correlation between the beamforming weights and selecting a transmission scheme based on the correlation.

11. An apparatus comprising:
a first plurality of antennas;
a receiver that is configured to process transmissions sent by less than all of a second plurality of antennas of a second apparatus and detected by the first plurality of antennas, wherein each transmission comprises a plurality of time-frequency instances;
a controller coupled to the receiver, wherein the controller is configured to:
compute a covariance matrix at the plurality of time-frequency instances within a received transmission and computing an instantaneous covariance matrix for a received transmission by averaging the covariance matrices for the plurality of time-frequency instances within a received transmission;

compute a long-term average covariance matrix from a sum of instantaneous covariance matrices over a time period comprising multiple transmissions received from the second apparatus;

compute a long-term average covariance matrix from a sum of instantaneous covariance matrices over a time period comprising multiple transmissions received from the second device at the first device determine a reliability of the instantaneous covariance matrix for a most recently received transmission from the second apparatus;

compute beamforming weights for transmitting one or more signal streams via the first plurality of antennas to the second plurality of antennas of the second apparatus based on the reliability of the instantaneous covariance matrix, wherein when it is determined that the instantaneous covariance matrix for the most recently received transmission is reliable, the beamforming weights are computed based on select eigenvectors associated with eigenvalues of the instantaneous covariance matrix for the most recent transmission and of the long-term average covariance matrix depending on whether a number P of signal streams to be transmitted from the first device to the second device and thus the number P of beamforming weights needed is greater than a number K of antennas at the second device used for transmissions to the first device, and when it is determined that the instantaneous covariance matrix for the most recently received transmission is not reliable, the beamforming weights are computed based on the long-term average covariance matrix; and apply the beamforming weights to the one or more signal streams to be transmitted via the first plurality of antennas to the second plurality of antennas of the second apparatus.

12. The apparatus of claim 11, wherein the controller is configured to compute the beamforming weights such that power is unequally distributed among a plurality of beams resulting from application of the beamforming weights to the one or more signal streams.

13. One or more non-transitory tangible media encoded with logic for execution and when executed operable to:

compute a covariance matrix at the plurality of time-frequency instances within a received transmission and computing an instantaneous covariance matrix for a received transmission by averaging the covariance matrices for the plurality of time-frequency instances within a received transmission, wherein each transmission comprises a plurality of time-frequency instances;

compute a long-term average covariance matrix from a sum of instantaneous covariance matrices over a time period comprising multiple transmissions received from the second device at the first device;

determine a reliability of the instantaneous covariance matrix for a most recently received transmission from the second device;

computing beamforming weights for transmitting one or more signal streams via the plurality of antennas of the first device to the plurality of antennas of the second device based on the reliability of the instantaneous covariance matrix, wherein when it is determined that the instantaneous covariance matrix for the most recently received transmission is reliable, the beamforming weights are computed based on select eigenvectors associated with eigenvalues of the instantaneous covariance matrix for the most recent transmission and of the long-term average covariance matrix depending on whether a number P of signal streams to be transmitted from the first device to the second device and thus the number P of beamforming weights needed is greater than a number K of antennas at the second device used for transmissions to the first device, and when it is determined that the instantaneous covariance matrix for the most recently received transmission is not reliable, the beamforming weights are computed based on the long-term average covariance matrix.

14. The non-transitory computer readable storage media of claim 13, and further comprising logic operable to apply the beamforming weights to the one or more signal streams to be transmitted via the plurality of antennas of the first device to the plurality of antennas of the second device.

15. The apparatus of claim 11, wherein the controller is further configured to determine the reliability of the instantaneous covariance matrix for the most recently received transmission by evaluating at least one of: a measure of frequency mismatch in uplink and downlink channels with respect to the second apparatus; degree of movement with respect to the second apparatus; time difference between time of transmission from the second apparatus and time of transmission to the second apparatus; and quality of the received transmission for which the instantaneous covariance matrix is computed.

16. The apparatus of claim 11, wherein the controller is further configured to compute the long-term average covariance matrix comprises weighting the respective instantaneous covariance matrices based on at least one of: signal-to-noise ratio of signals received from the second apparatus; signal-to-interference-plus-noise ratio of signals received from the second apparatus; degree of movement with respect to the second apparatus; and time difference between time of transmission from the second apparatus and time of transmission to the second apparatus.

17. The apparatus of claim 11, wherein when the controller determines that the instantaneous covariance matrix for the most recently received transmission is reliable and when the number P of signal streams to be transmitted and thus the number P of beamforming weights needed is less than the number K of antennas at the second apparatus used for transmissions, the controller is configured to compute the beamforming weights by setting the beamforming weights to P eigenvectors corresponding to the strongest eigenvalues of the instantaneous covariance matrix for the most recently received transmission.

18. The apparatus of claim 11, wherein when the controller determines that the instantaneous covariance matrix for the most recently received transmission is reliable and when the number P of signal streams to be transmitted to the second apparatus and thus the number P of beamforming weights needed is greater than the number K of antennas at the second apparatus used for transmissions, the controller is configured to compute the beamforming weights by setting the first K beamforming weights to K eigenvectors associated with the strongest eigenvalues of the instantaneous covariance matrix for the most recently received transmission and setting the remaining P−K beamforming weights to P−K eigenvectors associated with the P−K strongest eigenvalues of the long-term average covariance matrix R.

19. The apparatus of claim 11, wherein when the controller determines that the instantaneous covariance matrix for the most recently received transmission is not reliable and when the number P of signal streams to be transmitted to the second apparatus and thus the number P of beamforming weights needed is less than the number K of antennas at the second apparatus used for transmissions, the controller is configured to compute the beamforming weights by setting the beamforming weights to P eigenvectors corresponding to the strongest eigenvalues of the long-term average covariance matrix.

20. The apparatus of claim 11, wherein when the controller determines that the instantaneous covariance matrix for the most recently received transmission is not reliable and when the number P of signal streams to be transmitted to the second apparatus and thus the number P of beamforming weights needed is greater than the number K of antennas at the second apparatus used for transmissions, the controller is configured to compute the beamforming weights by setting the first K beamforming weights to K eigenvectors associated with the strongest eigenvalues of the long-term average covariance matrix R and setting the remaining P–K beamforming weights to P–K eigenvectors associated with the P–K strongest eigenvalues of a long-term average covariance matrix computed over multiple transmission for a previous time period.

21. The non-transitory computer readable storage media of claim 13, wherein the logic operable to determine the reliability of the instantaneous covariance matrix for the most recently received transmission comprises logic operable to evaluate at least one of: a measure of frequency mismatch in uplink and downlink channels between the first and second devices; degree of movement of one or both of the first and second devices; time difference between time of transmission from the second device to the first device and time of transmission from the first device to the second device; and quality of the received transmission for which the instantaneous covariance matrix is computed.

22. The non-transitory computer readable storage media of claim 13, wherein the logic operable to compute the long-term average covariance matrix comprises logic operable to weight the respective instantaneous covariance matrices based on at least one of: signal-to-noise ratio of signals received at the first device from the second device; signal-to-interference-plus-noise ratio of signals received at the first device from the second device; degree of movement of one or both of the first and second devices; and time difference between time of transmission from the second device to the first device and time of transmission from the first device to the second device.

23. The non-transitory computer readable storage media of claim 13, wherein when it is determined that the instantaneous covariance matrix for the most recently received transmission is reliable and when the number P of signal streams to be transmitted and thus the number P of beamforming weights needed is less than the number K of antennas at the second device used for transmissions to the first device, the logic operable to compute the beamforming weights comprises logic operable to set the beamforming weights to P eigenvectors corresponding to the strongest eigenvalues of the instantaneous covariance matrix for the most recently received transmission.

24. The non-transitory computer readable storage media of claim 13, wherein when it is determined that the instantaneous covariance matrix for the most recently received transmission is reliable and when the number P of signal streams to be transmitted to the second device and thus the number P of beamforming weights needed is greater than the number K of antennas at the second device used for transmissions to the first device, the logic operable to compute the beamforming weights comprises logic operable to set the first K beamforming weights to K eigenvectors associated with the strongest eigenvalues of the instantaneous covariance matrix for the most recently received transmission and setting the remaining P–K beamforming weights to P–K eigenvectors associated with the P–K strongest eigenvalues of the long-term average covariance matrix R.

25. The non-transitory computer readable storage media of claim 13, wherein when it is determined that the instantaneous covariance matrix for the most recently received transmission is not reliable and when the number P of signal streams to be transmitted from the first device to the second device and thus the number P of beamforming weights needed is less than the number K of antennas at the second device used for transmissions to the first device, the logic operable to compute the beamforming weights comprises logic operable to set the beamforming weights to P eigenvectors corresponding to the strongest eigenvalues of the long-term average covariance matrix.

26. The non-transitory computer readable storage media of claim 13, wherein when it is determined that the instantaneous covariance matrix for the most recently received transmission is not reliable and when the number P of signal streams to be transmitted from the first device to the second device and thus the number P of beamforming weights needed is greater than the number K of antennas at the second device used for transmissions to the first device, the logic operable to compute the beamforming weights comprises logic operable to set the first K beamforming weights to K eigenvectors associated with the strongest eigenvalues of the long-term average covariance matrix R and to set the remaining P–K beamforming weights to P–K eigenvectors associated with the P–K strongest eigenvalues of a long-term average covariance matrix computed over multiple transmission for a previous time period.

* * * * *